(12) United States Patent
Kizaki

(10) Patent No.: US 7,146,411 B2
(45) Date of Patent: Dec. 5, 2006

(54) SYSTEM, DEVICE, AND METHOD FOR INPUTTING IMAGE, AND STORAGE MEDIUM THEREFOR

(75) Inventor: Junichiro Kizaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 09/766,610

(22) Filed: Jan. 23, 2001

(65) Prior Publication Data

US 2001/0025326 A1    Sep. 27, 2001

(30) Foreign Application Priority Data

Jan. 27, 2000    (JP)    ............... 2000-018622
Dec. 15, 2000    (JP)    ............... 2000-382293

(51) Int. Cl.
G06F 15/177    (2006.01)
G06F 15/16    (2006.01)

(52) U.S. Cl. ...................... 709/220; 709/203
(58) Field of Classification Search ............... 709/203, 709/208, 220; 358/1.15; 382/307, 318
See application file for complete search history.

(56) References Cited

U.S. PATENT DOCUMENTS

| | | | | |
|---|---|---|---|---|
| 5,123,063 A | * | 6/1992 | Ohkubo | 382/318 |
| 5,508,821 A | * | 4/1996 | Murata | 358/442 |
| 5,532,841 A | * | 7/1996 | Nakajima et al. | 358/408 |
| 5,615,324 A | * | 3/1997 | Kuboyama | 345/441 |
| 5,720,013 A | * | 2/1998 | Uda et al. | 358/1.15 |
| 5,870,207 A | * | 2/1999 | Kamimoto et al. | 358/438 |
| 5,894,530 A | * | 4/1999 | Wilt | 382/321 |
| 5,911,044 A | * | 6/1999 | Lo et al. | 709/203 |
| 5,933,580 A | * | 8/1999 | Uda et al. | 358/1.13 |
| 6,134,595 A | * | 10/2000 | Huang et al. | 709/229 |
| 6,553,414 B1 | * | 4/2003 | Kakimoto et al. | 709/220 |
| 6,751,648 B1 | * | 6/2004 | Kakimoto et al. | 709/203 |
| 2003/0115255 A1 | * | 6/2003 | Kuroshima | 709/203 |
| 2003/0154258 A1 | * | 8/2003 | Kakimoto et al. | 709/208 |

* cited by examiner

Primary Examiner—Jeffrey Pwu
Assistant Examiner—J. Bret Dennison
(74) Attorney, Agent, or Firm—Fitzpatrick, Cella, Harper & Scinto

(57) ABSTRACT

An image input system prevents excessive load from being placed on a network when using an image input device via the network. When an application, such as an optical character recognition (OCR) application, running on a client computer is to utilize an image scanned by a scanner connected over the network, and when the application has designated a batch transfer mode as an image transfer mode, modules of the client computer virtually acquire the scanned image in the batch transfer mode and transfer the image to the application.

12 Claims, 12 Drawing Sheets

SYSTEM, DEVICE, AND METHOD FOR INPUTTING IMAGE, AND STORAGE MEDIUM THEREFOR

BACKGROUND OF THE INVENTION

1. Field of the Invention

The present invention relates to server-client systems in which shared use of an image input device over a network is facilitated.

2. Description of the Related Art

Recently, scanned images have been widely utilized in applications, such as optical character recognition (OCR) and photoretouching software, by using a system in which an image input device, such as a scanner, and a computer are connected by a local interface, such as a small computer system interface (SCSI).

Generally, there are two types of image acquiring modes, one of which is a batch transfer mode. In the batch transfer mode, the entirety of an image is scanned, and then the entire scanned image is transferred at one time to an application. The other mode is a sequential transfer mode in which parts of an image are transferred in sequence each time a part has been scanned.

The batch transfer mode is advantageous in that processing performed by the application is simplified since data can be received by the application all at once. In contrast, the sequential transfer mode is disadvantageous in that processing performed by the application becomes more complex since the application must receive partial data several times. On the other hand, the sequential transfer mode is advantageous in that the application side can be informed of progress during the scanning processing. If it is necessary, partially scanned images can be displayed, thus enabling a user to evaluate the image.

In general, the image transfer mode to be used is predetermined according to each application. The application instructs a driver which transfer mode is to be used, that is, the batch transfer mode or the sequential transfer mode.

When the image input device and the computer are connected over a network, such as a local area network (LAN), the batch transfer mode is disadvantageous in that the application puts excessive load on the network depending on the image to be scanned. Therefore, when a large image is to be scanned by the scanner connected to the network, the type of application which can be used is limited. The user may not select application software according to the user's preference.

SUMMARY OF THE INVENTION

In order to solve the above problems, it is an object of the present invention to provide an image input system for preventing excessive load from being placed on a network when an image input device is used over the network.

To achieve the foregoing objects, an image input system is provided in which at least first and second information processing units are connected via a network. A first control program is installed in the first information processing unit. The first control program controls an image input device to supply input image data to various application programs by a predetermined image input interface. A second control program is installed to supply image data input by the image input device to a first application program installed in the second information processing unit by transferring control information, which is exchanged between the first application program and the first control program, based on the image input interface via the network. Furthermore, a third control program compulsorily changes part of the data exchanged between the first application program and the first control program via the second control program.

Preferably, the image input interface may include, as modes for transferring image data from the input device to an application program, a first transfer mode for batch-transferring image data and a second transfer mode for dividing image data in data block units based on an instruction from the application and transferring blocks of the image data in sequence. The third control program may change the first transfer mode designated by the first application program to the second transfer mode. Accordingly, the network traffic are prevented from temporarily being congested, and system failures are thus prevented.

DESCRIPTION OF THE PREFERRED EMBODIMENTS

The present invention will be understood from the following description of the preferred embodiments with reference to the accompanying drawings.

Figure 9:
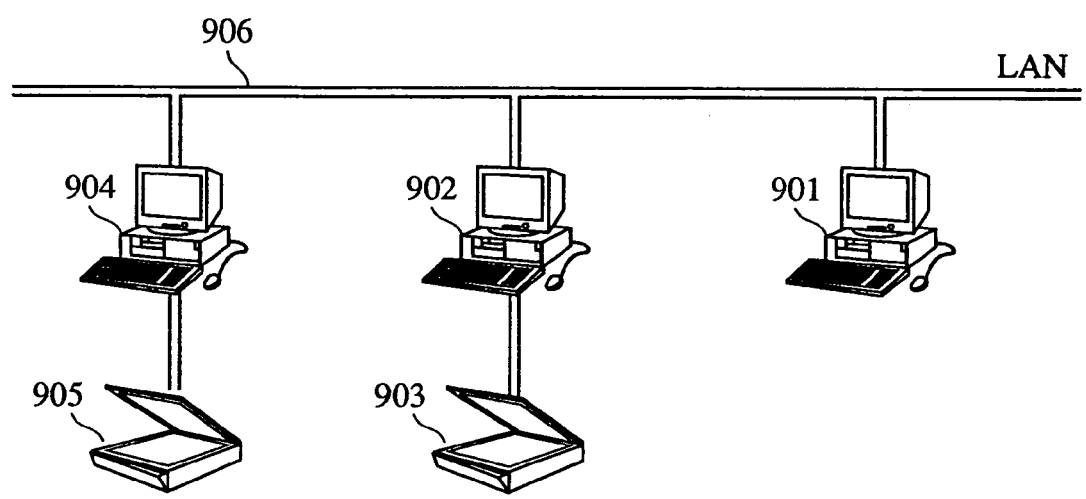
FIG. 9 shows the configuration of a network system of the first embodiment.

FIG. 9 shows an example of the configuration of a network system according to a first embodiment of the present invention. Referring to FIG. 9, computers 901, 902, and 904 are connected to a local area network (LAN) 906. Scanners 903 and 905, which are image input devices, are locally connected to the computers 902 and 904, respectively. The present invention is not limited to scanners and is applicable to image input devices other than scanners, such as digital cameras.

In the network system, each computer can use the scanner which is locally connected thereto. Also, each computer can use the scanner connected to another computer over the network. Specifically, an application, such as OCR software, running on the computer 902 acquires and utilizes an image scanned by the scanner 903 or the scanner 905.

In the following description, the computer 902, on which the application for acquiring a scanned image is included, is referred to as a "client computer". The computer 904 for allowing the client computer to use the scanner 905 over the network is referred to as a "server computer". When the computer 904 is to use the scanner 903, the computer 904 becomes the client computer, and the computer 902 becomes the server computer.

Figure 1:
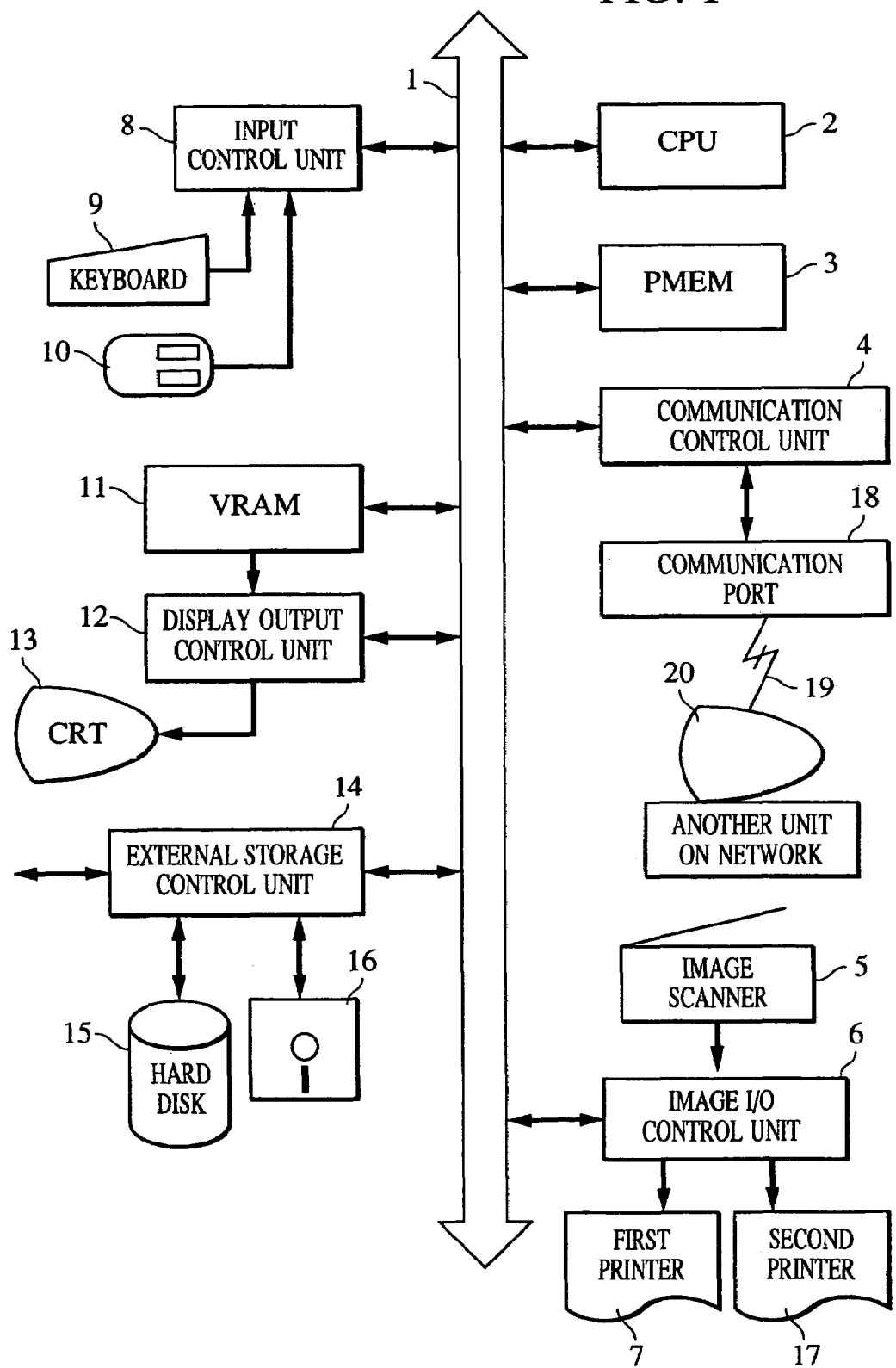
FIG. 1 is a block diagram of a server computer and a client computer according to a first embodiment of the present invention.

FIG. 1 shows the configuration of a system including the server computer, which is an image input device, according to the first embodiment. Each component described below is connected to a system bus 1. The system includes a central processing unit (CPU) 2 and a program memory (PMEM) 3. The PMEM 3 appropriately selects and loads a program used to perform various processing, such as editing and controlling the image input device, from a hard disk 15 and causes the CPU 2 to perform processing. Created data is stored in the PMEM 3, which serves as a memory for storing data. The PMEM 3 is also used as a temporary memory for storing text data input by a user using a keyboard 9.

A communication control unit 4 controls input and output of data to and from a communication port 18. A signal output from the communication port 18 is transferred to a communication port of another unit 20 connected to the network through a communication line 19. In the first embodiment, the other unit 20 is a client computer. Data is communicated through the communication control unit 4 with devices, such as printers and image input devices, for shared use over the network.

Although the network such as the LAN is described in the first embodiment, the present invention is also applicable to a public network including the communication port 18 connected to the communication control unit 4 and the communication line 19.

The system includes an image scanner 5, an image input and output (I/O) control unit 6, a first printer 7, and a second printer 17. Image data scanned by the image scanner 5 is expanded on the PMEM 3, and the expanded data is further expanded on a video random access memory (VRAM) 11. Subsequently, the data is displayed on a cathode-ray tube (CRT) 13.

The keyboard 9 and an input unit or peripheral device 10 are connected to an input control unit 8. An operator issues a system operation command by operating the keyboard 9. The peripheral device 10 is used to select image information, text data, and numeric data on the CRT 13 to designate processing and to set scanning parameters. In the first embodiment, a mouse is used as the peripheral device 10. By arbitrarily moving the cursor using the mouse in the X- and Y-directions on the CRT 13, an option can be selected from a menu. In addition, image data, graphic data, text data, numeric data, and scanning parameters can be selected and edited. The system includes a display output control unit 12. Data displayed on the CRT 13 is expanded as bitmapped data on the VRAM 11. For example, in the case of graphic data, a graphic pattern in accordance with the location and rendering attribute information of the graphic data is expanded on the VRAM 11. Software control directly generates a cursor on a display area of the VRAM 11, and hence the cursor can be displayed.

The system further includes an external storage control unit 14 and disks 15 and 16 for storing data files on which image data, graphic data, text data, and numeric data are recorded. For example, the disk 15 is a hard disk, and the disk 16 is a floppy disk. In the first embodiment, the hard disk 15 stores programs such as an image input device control function, a server extension, and a network server function. Storage media, such as a read only memory (ROM), the floppy disk 16, a compact disc read only memory (CD-ROM), the hard disk 15, a memory card, and a magneto-optical disk, can be used to store these programs.

A configuration similar to that shown in FIG. 1 applies to a system including the client computer.

Figure 2:
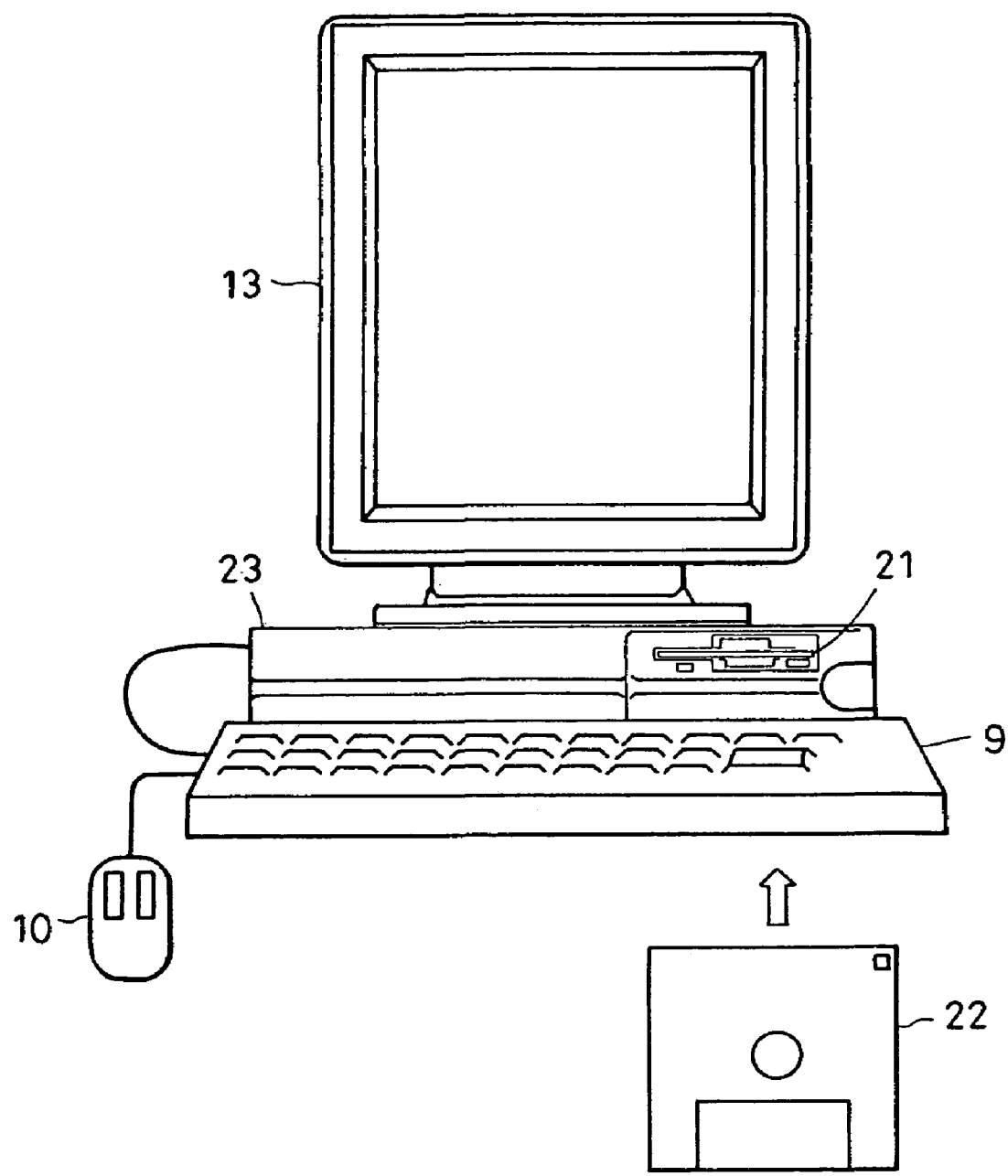
FIG. 2 is an external view of the server computer and the client computer of the first embodiment.

FIG. 2 is an external view of the server computer. A main unit 23 includes therein the system bus 1, the CPU 2, the PMEM 3, and the communication control unit 4. The floppy disk 22 is set in a floppy disk drive 21. Image data, graphic data, text data, and numeric data are written to the floppy disk 22. Also, image data, graphic data, text data, and numeric data recorded in the floppy disk 22 are read.

The external view of the client computer is similar to that shown in FIG. 2.

The present invention may be conveniently implemented using the server computer or the client computer including the hard disk 15 having recorded thereon various programs. The invention may also be implemented by providing another system, server computer, or client computer with a storage medium storing a program that can implement the present invention and causing the system or the computers to read and execute the program stored in the storage medium. For example, the floppy disk 22 having recorded thereon an image input device control function program, a server extension program, and a network server function program is set in a floppy disk drive 21 of another server computer. This server computer loads the programs into a hard disk 15 thereof and executes the loaded programs. In this manner, the present invention can be implemented using another server computer.

Figure 3:
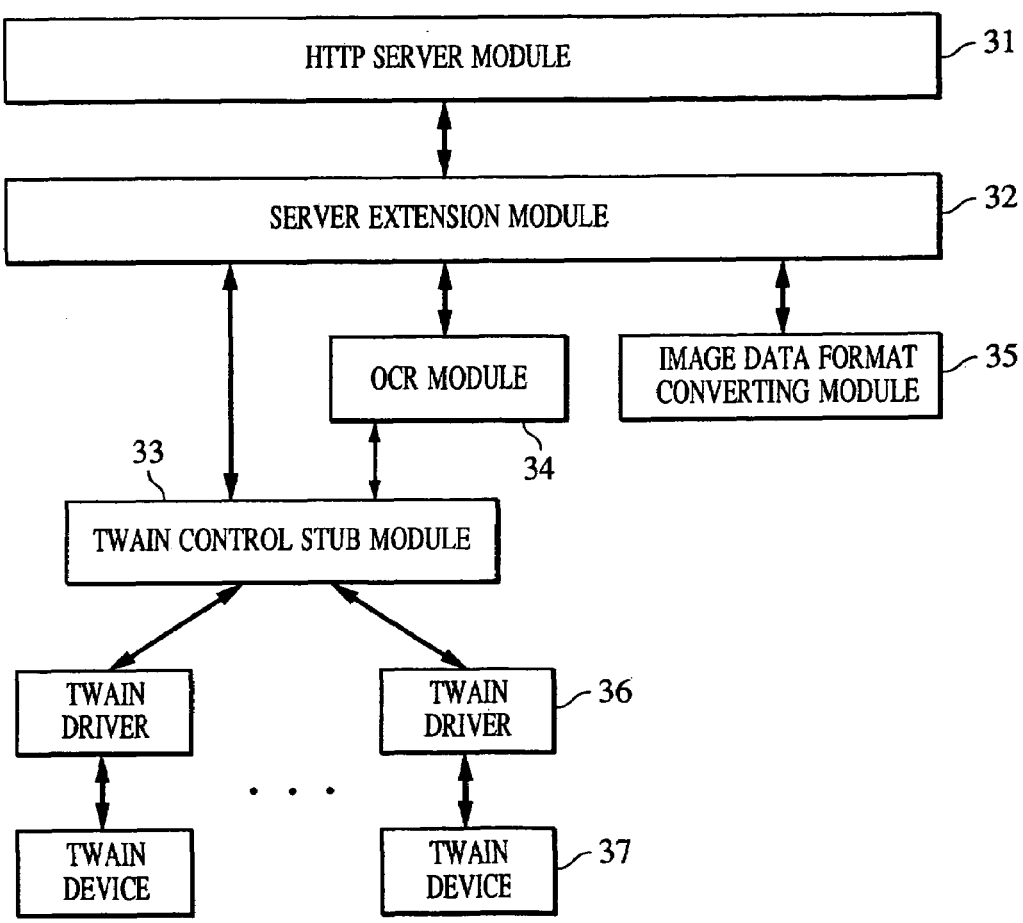
FIG. 3 is a block diagram of the configuration of modules in a program for the server computer of the first embodiment.

FIG. 3 shows the configuration of function modules in the server computer of the first embodiment.

In the first embodiment, a Technology-Without-Any-Interested-Name (TWAIN) device having a general interface is used as an image input device, and a Hypertext Transfer Protocol (HTTP) is used as a general network protocol for controlling communication of scanned image data.

An HTTP server module 31 uses the HTTP protocol to transfer data created by the server computer to the client computer. The HTTP server module 31 also transfers information given by the client computer to a server extension module 32. The server extension module 32 analyzes the information transferred from the HTTP server module 31 and controls a TWAIN control STUB module 33, an OCR module 34, and an image data format converting module 35. The server extension module 32 uses the HTTP server module 31 to transfer data scanned by the TWAIN device connected to the server to the client.

The TWAIN control STUB module 33 performs processing to list a plurality of TWAIN drivers 36 connected thereto and to select one of the TWAIN drivers 36 in accordance with an instruction from the client. The TWAIN control STUB module 33 sets parameters of the selected driver and transfers the resultant image data to the server extension module 32.

When the client computer sends a request to convert the image data scanned by the TWAIN device into text data, the OCR module 34 is invoked by the server extension module 32.

The image data format converting module 35 is a module for converting the format of image data obtained by a TWAIN device 37 into the image data format designated by the client.

The TWAIN drivers 36 are modules for controlling a plurality of TWAIN devices connected to the server computer.

The TWAIN control STUB module 33 uses the general TWAIN interface to communicate with the TWAIN drivers 36. Hence, shared use of an arbitrary TWAIN device (and the corresponding TWAIN driver 36) over the network is accomplished by utilizing these modules.

Scanning directive information is transferred from the application running on the client computer to the TWAIN driver 36 through the TWAIN control STUB module 33. The TWAIN driver 36 performs scanning of an image based on the scanning directive information.

When the "sequential transfer mode" is designated by the application, the image is scanned in scanning units and parts of the image are transferred in sequence by the HTTP server module 31 to the client computer each time a part has been scanned.

When the "batch transfer mode" is designated by the application, the image of the designated size is scanned and the scanned image is then batch-transferred by the HTTP server module 31 to the client computer. When acquiring an image in the "batch transfer mode", the network traffic per unit time is increased greatly while the image is being transferred.

Figure 4:
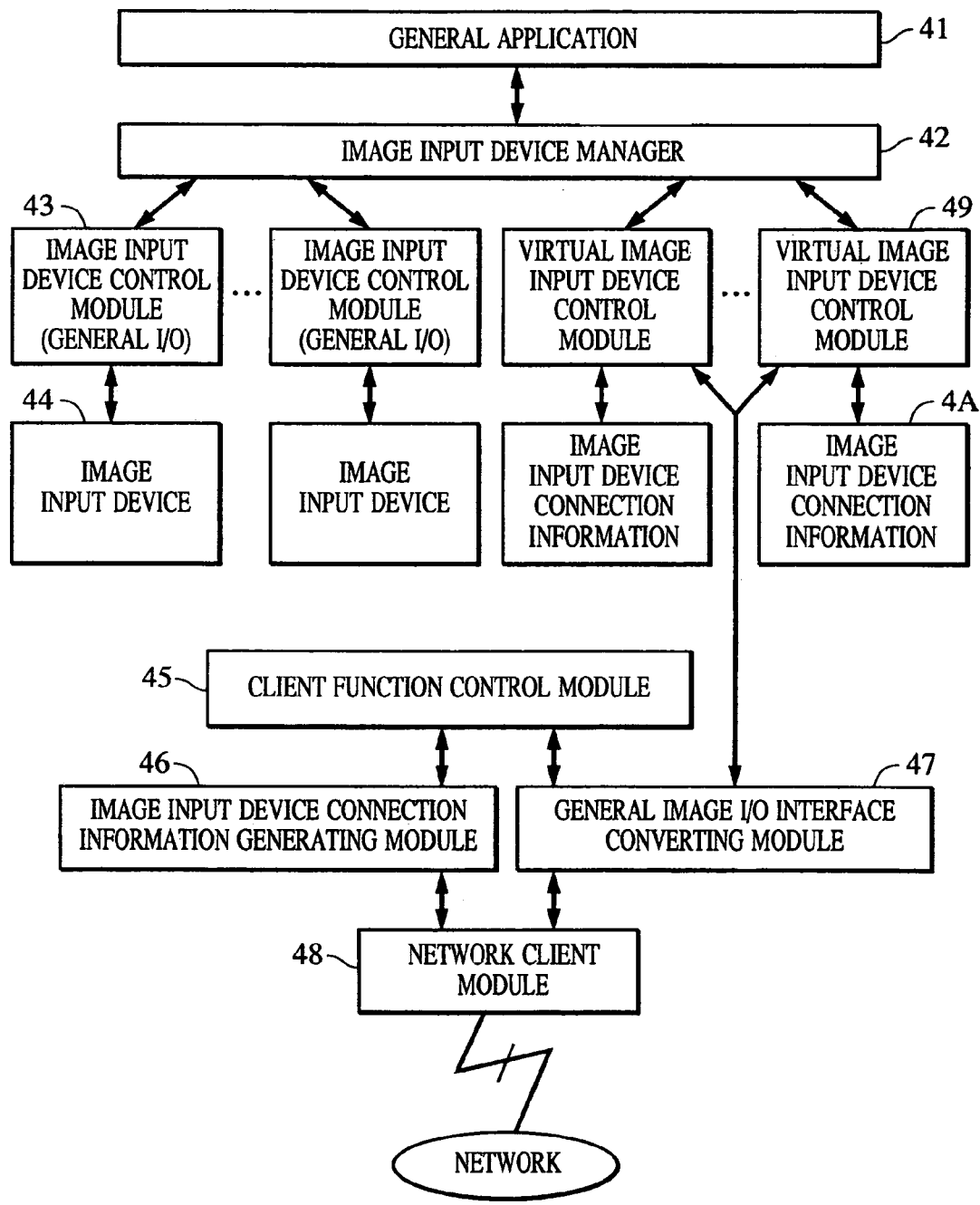
FIG. 4 is a block diagram of the configuration of modules in a program for the client computer of the first embodiment.

FIG. 4 shows an example of the configuration of function modules in the client computer of the first embodiment.

Referring to FIG. 4, an image input device manager 42 and image input device control modules (general I/O) 43 are components required to enable a general application 41 to gain access to image scanners 44 connected locally to the client computer.

A client function control module 45 and two pieces of image scanner function connection information 4A are components required to enable an image scanner connected to the server computer over the network to scan an image.

The image input device manager 42 provides the application 41 with a general image input and output (I/O) interface such as TWAIN. The image input device manager 42 communicates information with a designated one of the image input device control modules 43 under the control thereof in response to a directive from the I/O interface.

The image input device control modules 43 each include a general input/output (I/O). The image input device control modules 43 control the image scanners 44 each connected by the general interface, which is arranged in accordance with the image input device manager 42. The image input device control modules 43 provide the general interface. Specifically, the image input device manager 42 is, for example, a TWAIN manager, and the image input device control modules 43 are TWAIN drivers corresponding to the respective image input devices 44. The image scanners 44 are locally connected to the client computer.

The components required to enable the image input device connected to the server computer to scan an image will now be described.

The client function control module 45 controls the entire modules forming a client extension. An image input device connection information generating module 46 utilizes a network client module 48 to obtain attribute information of the image input device connected to the server computer and information required to establish network connection, thus generating the two pieces of image input device connection information 4A. At the same time, virtual image input device control modules 49 are automatically generated. Since the virtual image input device control modules 49 are generated, the image input device manager 42 can handle devices over the network as if they were virtually connected.

A general image I/O interface converting module 47 converts the control information obtained by utilizing the network client module 48, which is used to control the image input device at the server side, into the general interface in correspondence to the image input device manager 42. The general image I/O interface converting module 47 does not directly supply the interface function to the image input device manager 42. Instead, the general image I/O interface converting module 47 supplies the interface function to the image input device manager 42 via the virtual image input device control modules 49.

The network client module 48 converts the format of data into a communicable format, which corresponds to the general network protocol, so that the modules at the client side can communicate with modules at the server side over the network.

The virtual image input device control modules 49 are generated in one-to-one relationship with the preset image input devices over the network. Basically, the virtual image input device control modules 49 return the corresponding image input device connection information 4A or transfer the information to the general image I/O interface converting module 47. Also, the virtual image input device control modules 49 transfer the resultant information to the image input device manager 42. In other words, the virtual image input device control modules 49 only perform intermediate processing. Since a large portion of the actual processing is performed by the general image I/O interface converting module 47, the virtual image input device control modules 49 can be small. Hence, overhead is small even when a plurality of image input device modules are created over the network.

Figure 5:
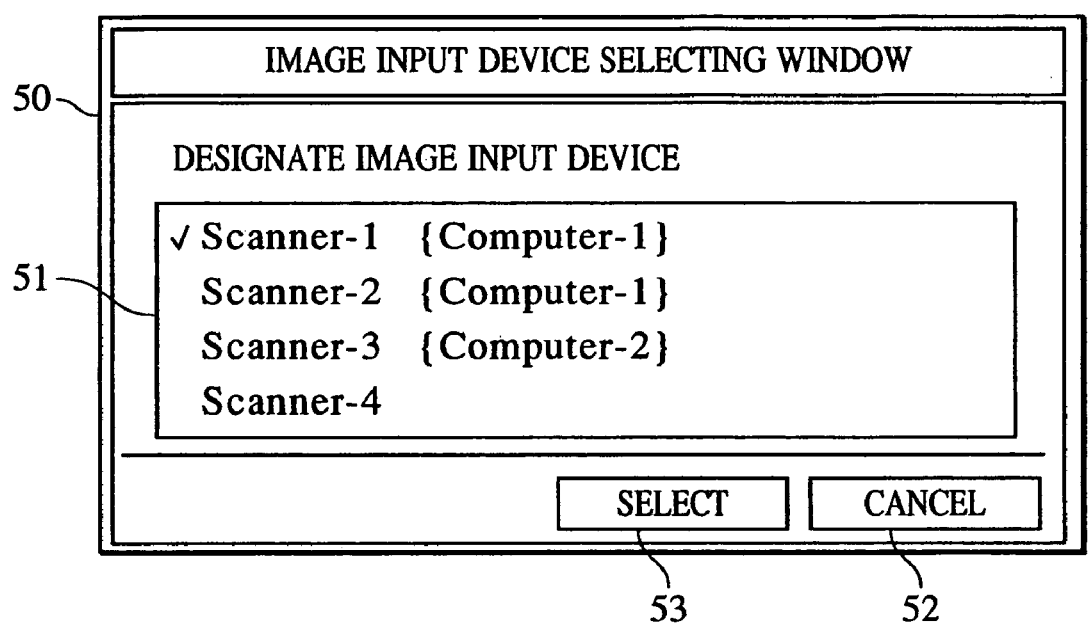
FIG. 5 shows an example of a screen for selecting an image scanner of the first embodiment.

FIG. 5 shows an example of a screen for selecting an image input device by the client computer. A device selecting screen 50 is displayed on the CRT 13 by performing predetermined operations in the application 41.

A list box 51 is used to select an image input device. The list box 51 displays a list including an image input device connected to the client computer and image input devices connected over the network. In the list box 51, the name of the image input device connected to the client computer is displayed, and the names of the image input devices over the network and the names of server computers to which the image input devices are connected are displayed.

In the first embodiment, the selected image input device is indicated by a check mark. The image input device can be selected using the peripheral device 10 by moving a pointer operatively associated with the peripheral device 10 to a desirable image input device and clicking a button of the peripheral device 10. Alternatively, the image input device can be selected by key input using the keyboard 9. By selecting and pressing a selection button 53, the selected image input device is confirmed. By selecting and pressing a cancel button 52, the operation thus far is cancelled. The pressing is performed using the peripheral device 10 or the keyboard 9.

Although the name of the image input device is used to select the image input device in the example shown in FIG. 5, the identification number of the SCSI can be used when the image input device is connected to the SCSI.

Although the selectable server computers are in the same domain in the example shown in FIG. 5, it is also possible to select an image input device in another domain.

Figure 10:
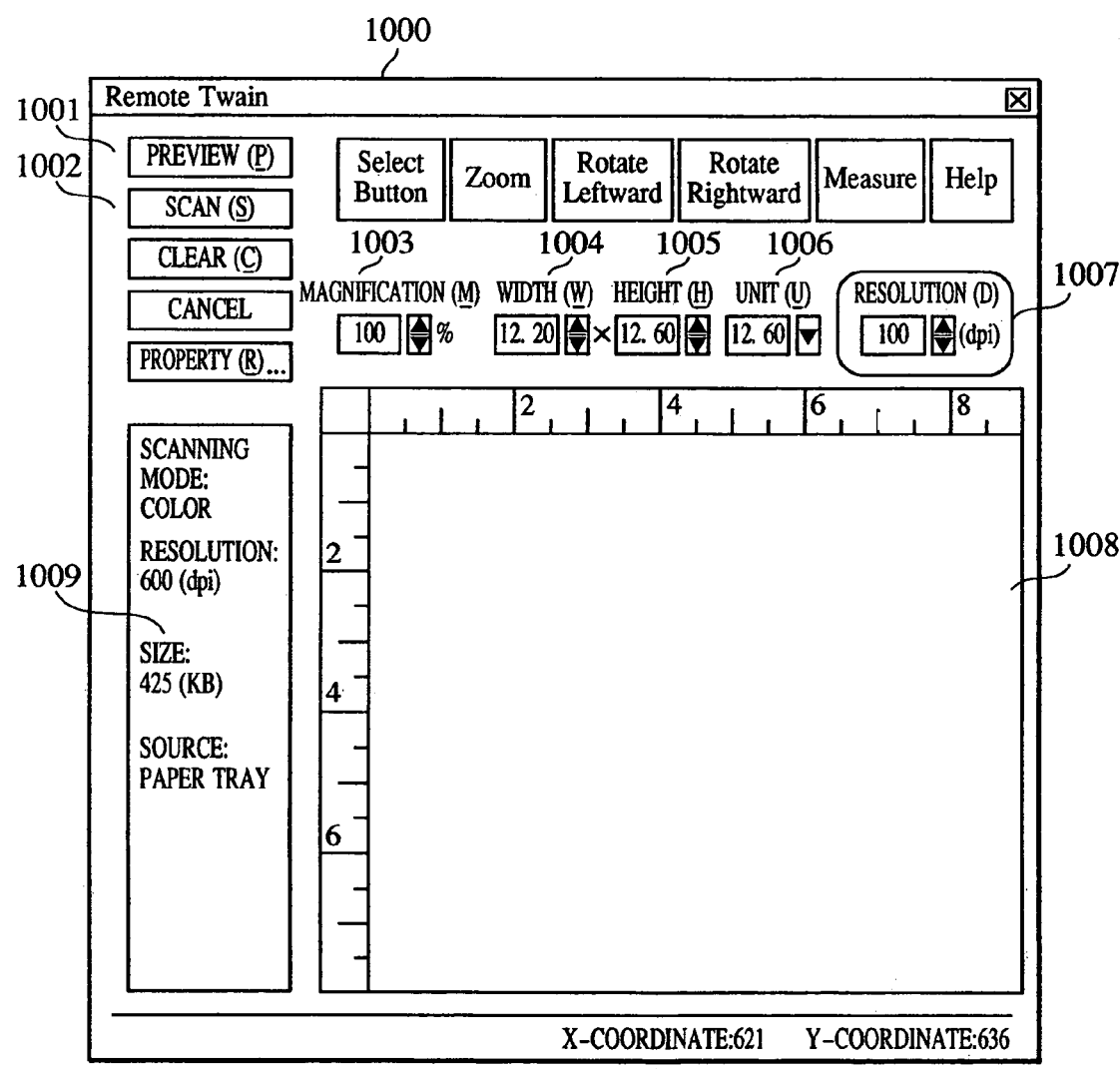
FIG. 10 shows an example of a screen used to set scanning conditions of the first embodiment.

FIG. 10 shows an example of a screen for setting image input device scanning conditions, which is activated by the client computer.

Referring to FIG. 10, there are settable parameters such as a scanning resolution 1007, a scanning magnification 1003, a scanning width 1004, a scanning height 1005, and a width/height unit 1006. When a scan button 1002 is pressed subsequent to setting these parameters, the image input device starts scanning image data, and the acquired image data is displayed on a region 1008. A size 1009, which is the size of image data to be scanned (hereinafter referred to as "scanned image size"), is computed based on preset values for the parameters 1003 and 1007. The scanned image size 1009 is used in a second embodiment described hereinafter.

In the first embodiment, when the application 41 designates the "batch transfer mode" while an image is being scanned via the network, the operation mode is switched to the "sequential transfer mode" and scanning directive information is transferred to the server computer side.

Figure 6:
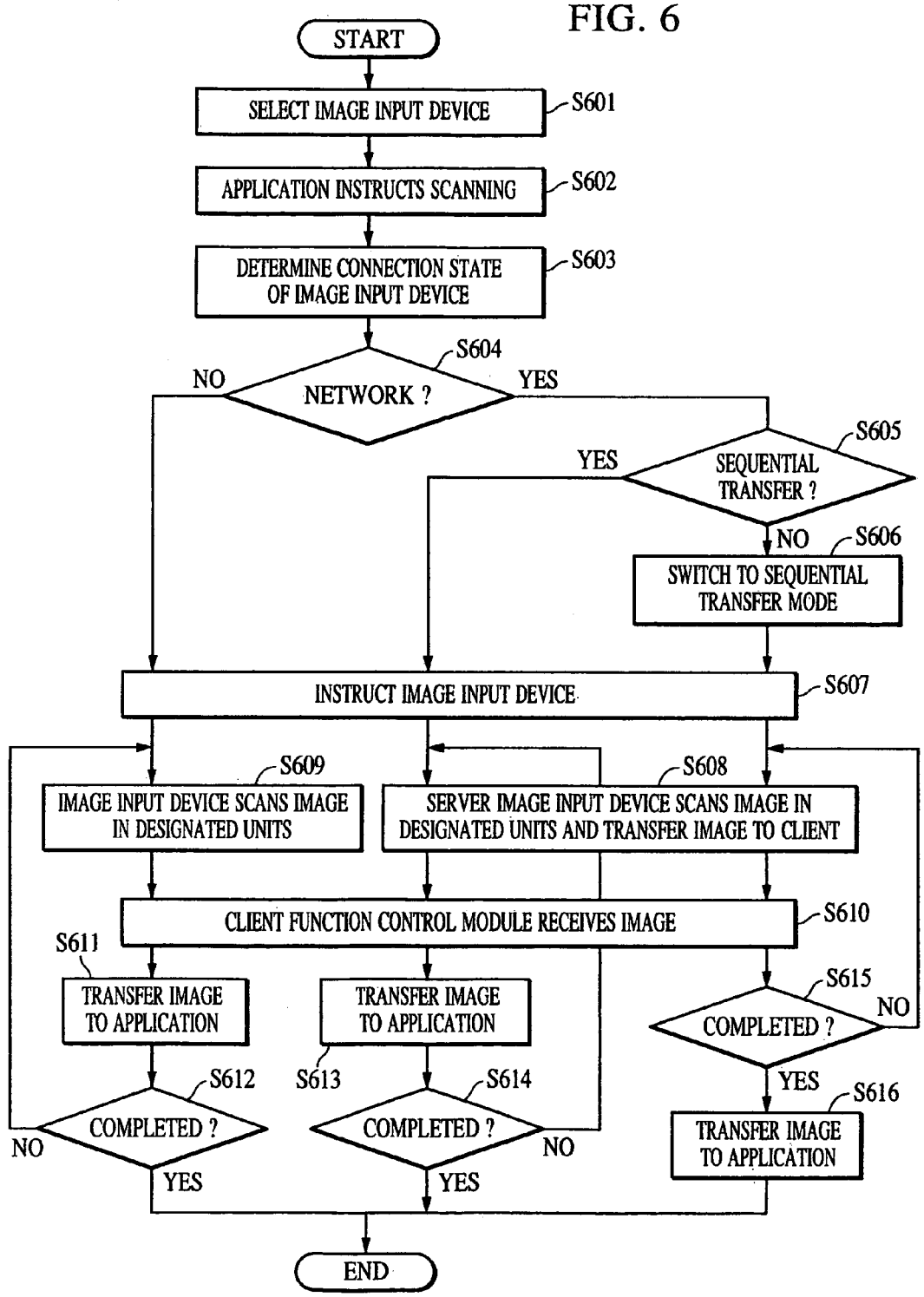
FIG. 6 is a flowchart showing a process of the first embodiment.

FIG. 6 is a flowchart showing a process according to the first embodiment.

In step S601, an operator selects an image input device to be used by the application 41. The selection is performed on the device selecting screen 50 shown in FIG. 5.

In step S602, the scanning directive information is transferred from the application 41 through the image input device manager 42 to the client function control module 45. At the same time, the application 41 designates the image transfer mode (the batch transfer mode or the sequential transfer mode).

In step S603, the client function control module 45 checks whether the selected image input device is locally connected to the client computer or is connected to the network. In step S604, the client function control module 45 determines the check result. Since the client computer manages the image input device by distinguishing the connection state, i.e. whether the image input device is locally connected or is connected to the network, the determination can be performed based on the management information. If the image input device is connected to the network, in step S605, it is determined whether the image transfer mode designated by the application 41 is the "sequential transfer mode".

In steps S604 and 605, the process is separated into three cases: "the image input device is locally connected" (No branch of step S604); "the image input device is connected to the network and the sequential transfer mode has been designated" (Yes branch in steps S604 and S605); and "the image input device is connected to the network and the batch transfer mode has been designated" (Yes branch in step S604 and No branch in step S605).

If it is determined that "the image input device is locally connected", the image transfer mode has no influence on the network. Hence, the transfer mode designated by the application 41 is used as it is. Specifically, in step S607, the client function control module 45 outputs scanning directive information to each image input device. In steps S609 to S612, an image is transferred to the application 41. In the sequential transfer mode, an image is scanned in scanning units in accordance with the image input device. In the batch transfer mode, an image of the designated size is scanned.

If it is determined that "the image input device is connected to the network and the sequential transfer mode has been designated", in step S607, the client control function module 45 transfers scanning directive information to the server computer over the network through the general image I/O interface converting module 47 and the network client module 48. Subsequently, the image is batch-transferred from the server computer by processing in steps S608, S610, S613, and S614.

If it is determined that "the image input device is connected to the network and the batch transfer mode has been designated", in step S606, the client function control module 45 switches the image transfer mode, which is included in the scanning directive information transferred from the application 41, to the "sequential transfer mode". In step S607, the client function control module 45 transfers the scanning directive information to the server computer over the network through the general image I/O interface converting module 47 and the network client module 48. In steps S610 and S615, the client function control module 45 receives an image in the sequential transfer mode from the server computer. In step S616, the client function control module 45 batch-transfers the received image to the application 41. Accordingly, the client function control module 45 virtually transfers the data in the "sequential transfer mode".

As described above, according to the first embodiment, when the application 41 designates the "batch transfer mode" when the image is scanned over the network, the transfer mode is switched to the "sequential transfer mode" and the scanning directive information is transferred to the server computer side. Accordingly, even when the application 41 has designated the "batch transfer mode" as the image transfer mode, it is possible to prevent the network from bearing too heavy a load caused by transferring a scanned image.

When the size of the scanned image is not so large that it will not put a heavy load on the network, it may be disadvantageous in that the scanning time is prolonged due to overhead caused by virtually transferring data in the "sequential transfer mode" using the client function control module 45.

According to the second embodiment, when the application 41 has designated the "batch transfer mode" while scanning an image over the network, the image transfer mode is switched to the "sequential transfer mode" when the size of the scanned image is equal to or larger than a predetermined threshold value. When the size is smaller than the threshold value, the image is scanned in the image transfer mode designated by the application 41.

Figure 7:
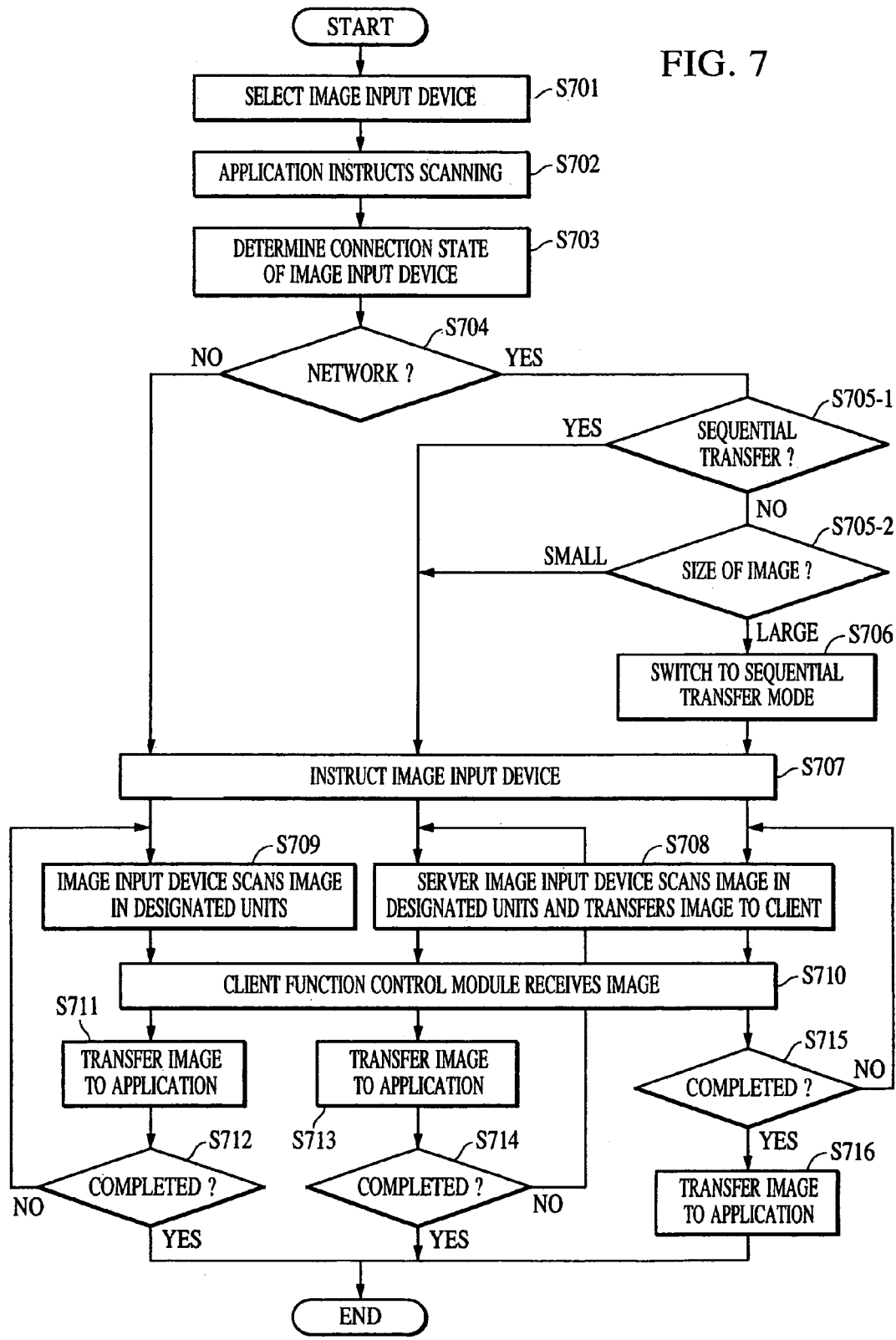
FIG. 7 is a flowchart showing a process according to a second embodiment of the present invention.

FIG. 7 is a flowchart showing a process performed by the client computer in the second embodiment.

Processing steps differing from those in FIG. 6 are described below.

As in the first embodiment, the application 41 on the client computer activates the image input device to start scanning an image (steps S701 and S702). The application 41 transfers the scanning directive information, which includes the image transfer mode (the batch transfer mode or the sequential transfer mode) and the information such as the scanned image size set by the user on the setting screen shown in FIG. 10, to the client function control module 45.

If it is determined, in step S704, that the selected image input device is connected to the network, the process proceeds to step S705-1.

In step S705-1, it is determined whether the application 41 has designated the "sequential transfer mode" as the image transfer mode. If the determination is negative, that is, if the "batch transfer mode" is designated, the process proceeds to step S705-2.

In step S705-2, the client function control module 45 determines whether the scanned image size, which is designated by the application 41, is equal to or larger than the predetermined threshold value. The threshold value indicates an upper limit of the scanned image size not having a great impact on the load of the network. If the determination in step S705-2 is negative, the image is transferred in the "batch transfer mode" as designated by the application 41. If the determination is affirmative, in step S706, the client function control module 45 switches the image transfer mode, which is included in the scanning directive information sent from the application 41, to the "sequential transfer mode". In step S707, the client function control module 45 transfers the scanning directive information to the server computer on the network through the general image I/O interface converting module 47 and the network client module 48.

The subsequent processing steps are similar to those shown in FIG. 6.

As described above, according to the second embodiment, when the application 41 has designated the "batch transfer mode" when scanning an image via the network, the image transfer mode is switched to the "sequential transfer mode" when the size of the scanned image is equal to or larger than the predetermined threshold value. When the size is smaller than the threshold value, the image is scanned in the image transfer mode designated by the application 41. Therefore, when the size of the scanned image is such that it will not influence the load on the network, the image is scanned in the image transfer mode designated by the application 41. It is thus possible to suppress influence of overhead caused by virtually scanning and transferring data in the "sequential transfer mode".

A third embodiment is described next.

In the first and second embodiments, systems are described in which one of the sequential transfer mode and the batch transfer mode is selected, and the scanned image obtained by the image input device such as the image scanner is transferred to the client computer via the network. According to the third embodiment, a technique is described for displaying optimal image transfer progress (hereinafter referred to as a "progress indicator") to a user of the client apparatus in accordance with the selected image transfer mode, that is, the sequential transfer mode or the batch transfer mode.

In the case of the sequential transfer mode, the image input operation is performed in parallel with the image transfer operation. Hence, the user of the client apparatus is not conscious of the operating time prior to the start of transferring the input image data.

In contrast, in the case of the batch transfer mode, the server computer starts transferring an image to the client computer subsequent to the completion of inputting the image. The operating time prior to the start of transferring the input image data relative to the overall operating time is longer than that in the sequential transfer mode.

According to the third embodiment, the optimal progress indicator in accordance with the image transfer mode informs the user of detailed progress of the image scanning operation.

Figure 11:
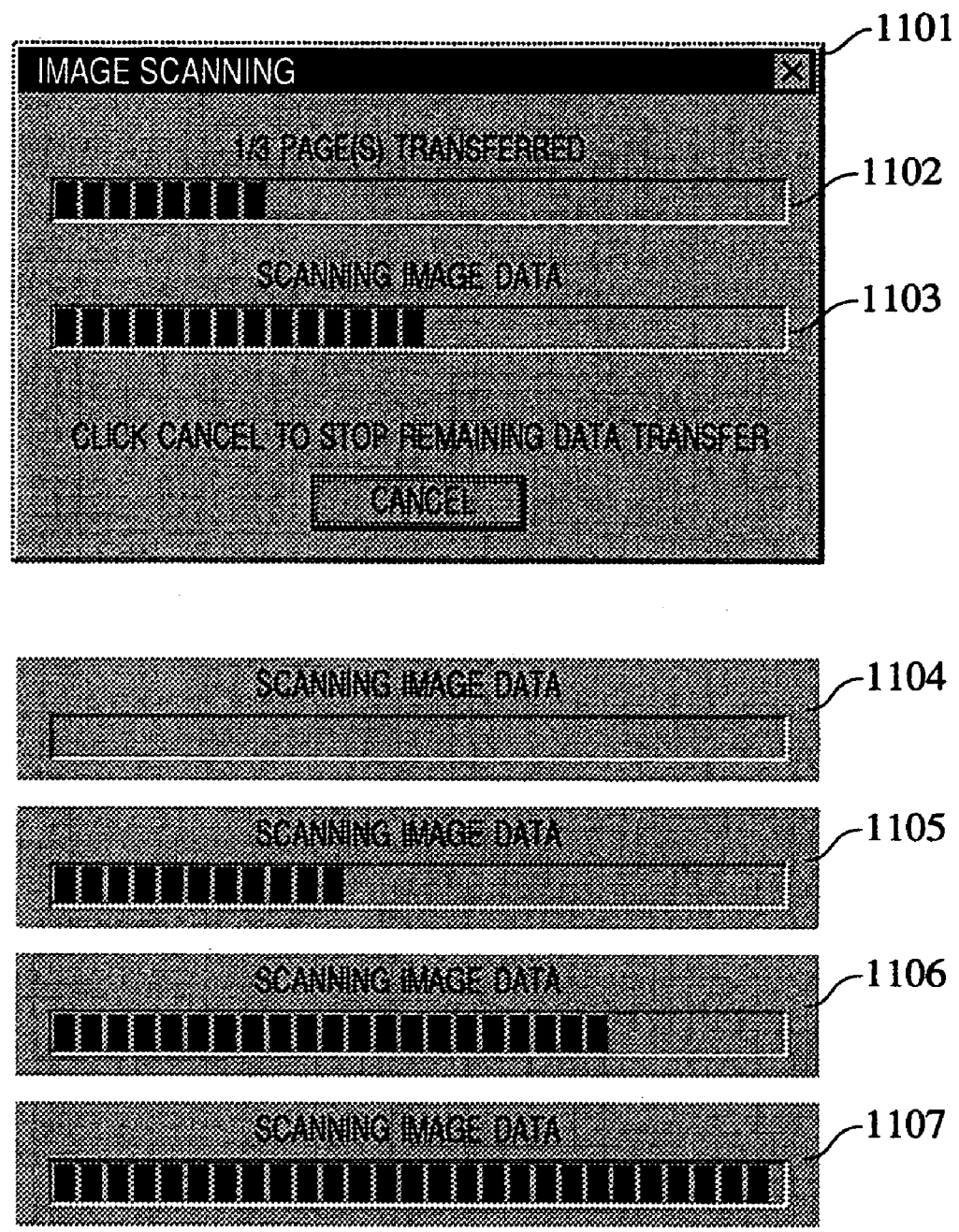
FIG. 11 shows examples of progress indicators in a "sequential transfer mode"

FIG. 11 shows an example of a display screen showing progress indicators in the sequential transfer mode. A display screen 1101 shows a progress indicator 1102 indicating the number of scanned pages relative to the total number of pages. A progress indicator 1103 indicates the size of scanned data relative to the size of the overall data for the page being scanned. The progress indicator 1103 indicates the stages of progress by displaying progress indicators 1104, 1105, 1106, and 1107 in ascending order of size as parts of the image are received in sequence by the client computer.

Figure 12:
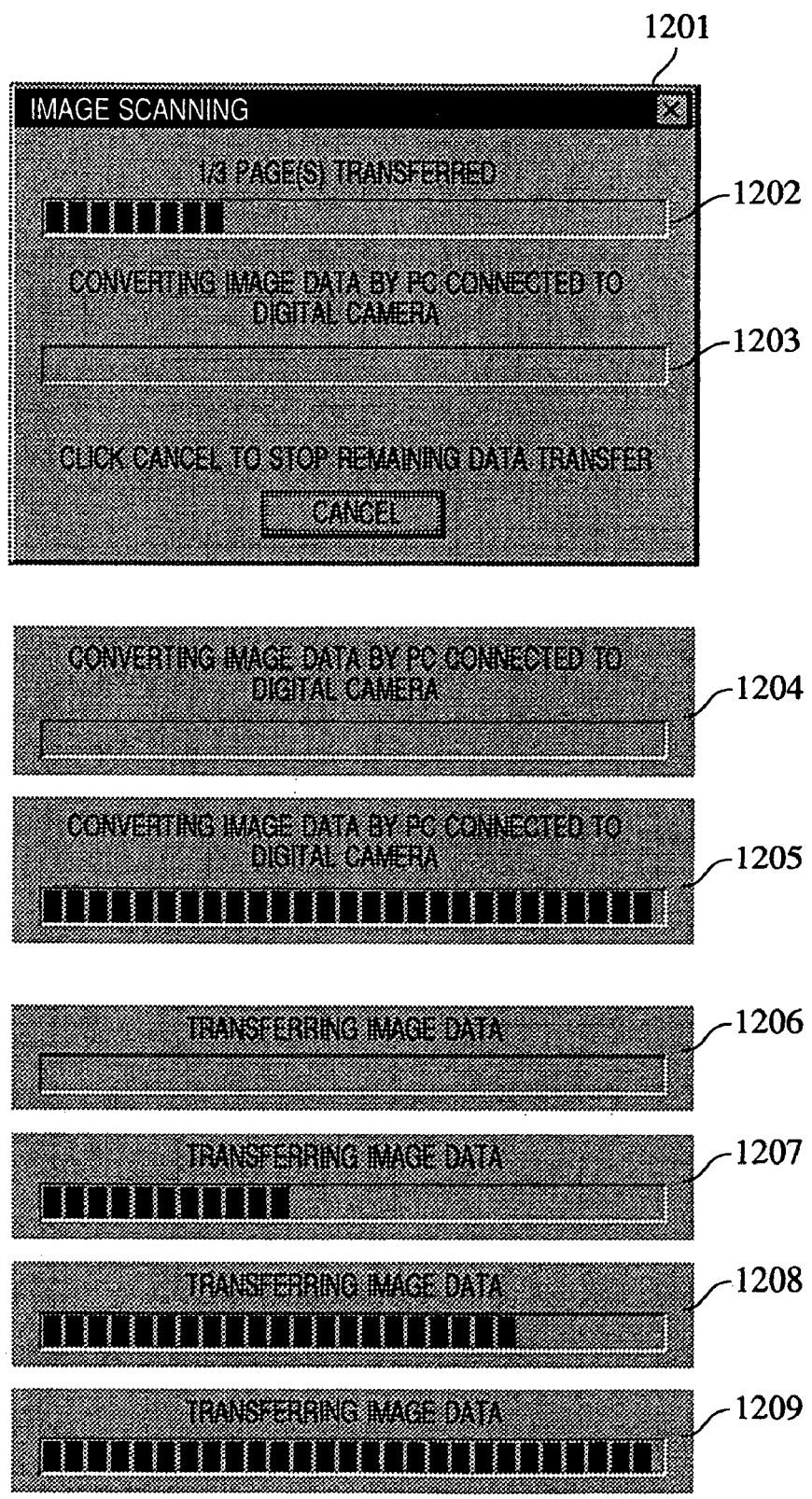
FIG. 12 shows example of progress indicators in a "batch transfer mode".

FIG. 12 shows an example of a display screen showing progress indicators in the batch transfer mode. A display screen 1201 includes a progress indicator 1202 indicating the number of pages scanned relative to the total number of pages, as in the progress indicator 1102 shown in FIG. 11. A progress indicator 1203 indicates the size of scanned data relative to the size of the overall data for the page being scanned. Unlike the progress indicators in FIG. 11, the progress indicators in FIG. 12 separately indicate two different statuses. Specifically, a first status indicates that data to be transferred from the server computer is being generated from a scanned image on one page. A second status indicates that the image data is being transferred from the server computer to the client computer. Switching from the first status to the second status is performed when the client computer starts receiving the image data from the server computer.

According to the third embodiment, the appropriate progress indicator mode is selected in accordance with the selected image transfer mode, that is, the sequential transfer mode or the batch transfer mode. The user is thus informed of detailed progress of the image input operation.

Although the image input device is a TWAIN device in the above embodiments, an image input device with another type of interface can be used.

Figure 8:
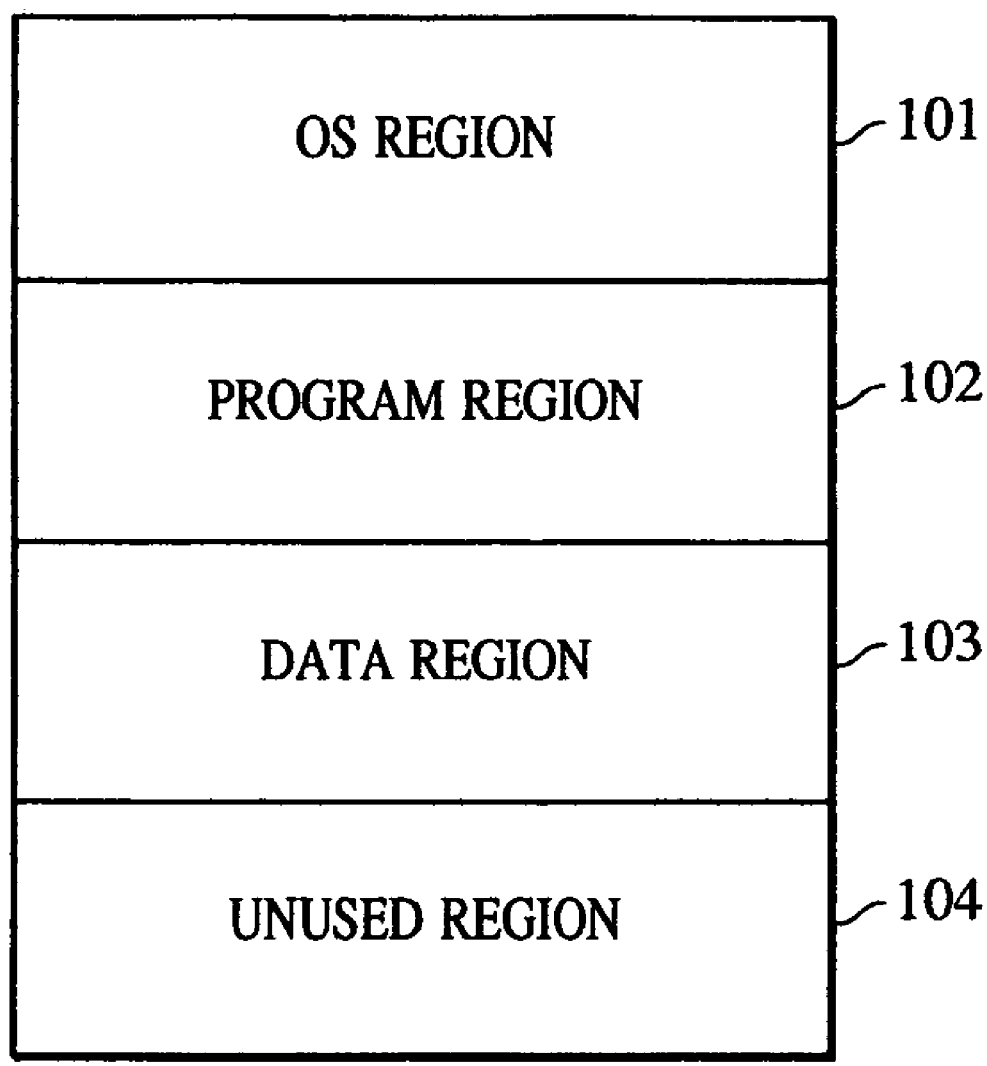
FIG. 8 shows a memory map according to a third embodiment of the present invention.

FIG. 8 shows an example of a memory map indicating the arrangement of data in the PMEM 3 of the server computer and the client computer in the above embodiments. The memory map includes an operating system (OS) region 101, a program region 102 occupied by a word processing software program, a data region 103 used by various programs, and an unused region 104. The upper the region, the lower the address. The lower the region, the higher the address.

The present invention can be achieved by a computer (or CPU or MPU) of a system or an apparatus by reading a storage medium having recorded thereon software program code implementing the functions of the above embodiments and executing the program code. In this case, the program code itself performs the functions of the above embodiments, and the present invention is embodied by the storage medium storing the program code.

The storage medium for providing the program code includes, for example, a floppy disk, a hard disk, an optical disk, a magneto-optical disk, a CD-ROM, a CD-recordable (CD-R), a magnetic tape, a nonvolatile memory card, or a ROM.

The present invention covers not only the case in which the functions of the above embodiments are performed by executing the program code read by the computer, but also a case in which the OS or the like running on the computer performs part or the entirety of the actual processing based on instructions from the program code, thereby performing the functions of the above embodiments. For example, an application program interface (API) provided by the OS can be used in the above embodiments to facilitate processing such as automatically adding national information to a cover page and displaying additional information on a cover page preview.

The present invention also covers a case in which, after the program code read from the storage medium is written to a memory of an add-on board inserted in the computer or an add-on unit connected to the computer, a CPU of the add-on board or the add-on unit performs part or the entirety of the actual processing based on instructions from the program code, thereby performing the functions of the above embodiments.

The program code may be MPU-native code. Alternatively, the program code may be written in a predetermined interpreter language, and the program code is converted into the MPU-native code when running the program code. Also, the program code may be script data written in a predetermined format, which is to be interpreted and executed by the OS.

As described above, according to the present invention, when the "batch transfer mode" is designated by the application via the network, the transfer mode is switched to the "sequential transfer mode" and the scanning directive information is transferred to the server computer side. It is thus possible to prevent excessive load, which is caused by transferring the scanned image, from being placed on the network.

According to the invention, even when the application has designated the "batch transfer mode" via the network, the image is scanned in the image transfer mode designated by the application when the size of the scanned image is not so large that it will not put a heavy load on the network. It is thus possible to suppress influence of overhead caused by virtually scanning and transferring data in the "sequential transfer mode".

Accordingly, the choice of image-associated applications which can be used by the user is not limited.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image input system in which at least first and second information processing apparatuses are connected via a network, comprising:
    first control means in the first information processing apparatus controlling a first image input device connected to the first information processing apparatus;
    determination means for determining whether the image input device is locally connected to the first information processing apparatus or is connected via the network to the first information processing apparatus; and
    receiving means for receiving image data in a batch transfer mode from the image input device when the determination means determines that the image input device is locally connected to the first information processing apparatus, and for receiving image data in a sequential transfer mode input by the image input device, via an external apparatus connected to the image input device, parallel to an input process at the image input device when the determination means determines that the image input device is connected to the first information processing apparatus via the network.

2. An information processing apparatus for controlling an image input device, comprising:
    determination means for determining whether the image input device is locally connected to the information processing apparatus, or whether the image input device is connected to the information processing apparatus via a network; and
    receiving means for receiving image data in a batch transfer mode from the image input device when the determination means determines that the image input device is locally connected to the information processing apparatus, and for receiving in a sequential transfer mode, parallel to an input process at the image input device, via an external apparatus connected to the image input device, image data input by image input device when the determination means determines that the image input device is connected to the information processing apparatus via the network.

3. The information processing apparatus according to claim 2, wherein, the receiving means receives divided image data in data block units when the determination means determines that the image input device is connected to the information processing apparatus via the network.

4. The information processing apparatus according to claim 3, wherein, the receiving means receives the image data in the batch transfer mode from the image input device when the determination means further determines that a size of the input image data input by the image input device is smaller than a predetermined size.

5. An information processing method for an information processing apparatus for controlling an image input device, said information processing method comprising:
    a determination step of determining whether the image input device is locally connected to the information processing apparatus, or whether the image input device is connected to the information processing apparatus via a network; and
    a receiving step of receiving image data in a batch transfer mode from the image input device when the determination step determines that the image input device is locally connected to the information processing apparatus, and receiving in a sequential transfer mode, parallel to an input process at the image input device, via an external apparatus connected to the image input device, image data input by the image input device when the determination step determines that the image input device is connected to the information processing apparatus via the network.

6. The information processing method according to claim 5, wherein, the receiving step receives divided image data in data block units when the determination step determines that the image input device is connected to the information processing apparatus via the network.

7. The information processing method according to claim 6, wherein, the receiving step receives the image data in the batch transfer mode from the image input device when the determination means further determines that a size of the input image data input by the image input device is smaller than a predetermined size.

8. A computer readable storage medium having recorded thereon a computer program to be executed by an information processing apparatus for controlling an image input device, said computer program comprising:
    a determination step of determining whether the image input device is locally connected to the information processing apparatus, or whether the image input device is connected to the information processing apparatus via a network; and
    a receiving step of receiving image data in a batch transfer mode from the image input device when the determination step determines that the image input device is locally connected to the information processing apparatus, and receiving in a sequential transfer mode, parallel to an input process at the image input device, via an external apparatus connected to the image input device, image data input by the image input device when the determination step determines that the image input device is connected to the information processing apparatus via the network.

9. The computer readable memory medium according to claim 8, wherein the receiving step receives divided image data in data block units when the determination step determines that the image input device is connected to the information processing apparatus via the network.

10. A computer program embodied on a computer readable storage medium to be executed by an information processing apparatus for controlling an image input device, comprising:

code for a determination step of determining whether the image input device is locally connected to the information processing apparatus, or whether the image input device is connected to the information processing apparatus via a network; and code for a receiving step for receiving image data in a batch transfer mode from the image input device when the determination step determines that the image input device is locally connected to the information processing apparatus, and receiving in a sequential transfer mode, parallel to an input process at the image input device, via an external apparatus connected to the image input device, image data input by the image input device when the determination step determines that the image input device is connected to the information processing apparatus via the network.

11. The computer program according to claim 10, wherein, the receiving step receives divided image data in data block units when the determination step determines that the image input device is connected to the information processing apparatus via the network.

12. An information processing apparatus for controlling an image input device, comprising:

a determination unit that determines whether the image input device is locally connected to the information processing apparatus, or whether the image input device is connected to the information processing apparatus via a network; and a receiver that receives image data in a batch transfer mode from the image input device when the determination unit determines that the image input device is locally connected to the information processing apparatus, and that receives in a sequential transfer mode, parallel to an image input process at the image input device, via an external apparatus connected to the image input device, image data input by the image input device when the determination unit determines that the image input device is connected to the information processing apparatus via the network.

\* \* \* \* \*

UNITED STATES PATENT AND TRADEMARK OFFICE
CERTIFICATE OF CORRECTION

PATENT NO. : 7,146,411 B2  Page 1 of 1
APPLICATION NO. : 09/766610
DATED : December 5, 2006
INVENTOR(S) : Kazaki It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (388) days Delete the phrase "by 388" and insert -- by 385 days--

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,146,411 B2  Page 1 of 1
APPLICATION NO. : 09/766610
DATED : December 5, 2006
INVENTOR(S) : Kizaki It is certified that error appears in the above-identified patent and that said Letters Patent is hereby corrected as shown below:

COLUMN 3:
Line 54, "bitmapped" should read -- bit-mapped --.

COLUMN 7:
Line 37, "605," should read -- S605, --.

COLUMN 10:
Line 27, "upper" should read -- higher --.

COLUMN 11:
Line 67, "an input process" should read -- an image input process --.

COLUMN 12:
Line 2, "by image" should read -- by the image --.

COLUMN 13:
Line 1, "memory" should read -- storage --.

Signed and Sealed this

Eighth Day of January, 2008

JON W. DUDAS
*Director of the United States Patent and Trademark Office*